(12) United States Patent
Simeoni

(10) Patent No.: US 8,099,628 B2
(45) Date of Patent: Jan. 17, 2012

(54) SOFTWARE PROBLEM IDENTIFICATION TOOL

(75) Inventor: Maurizio Simeoni, Frosinone (IT)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 12/469,292

(22) Filed: May 20, 2009

(65) Prior Publication Data

US 2009/0307668 A1 Dec. 10, 2009

(30) Foreign Application Priority Data

Jun. 5, 2008 (EP) .................................... 08157626

(51) Int. Cl.
*G06F 11/00* (2006.01)
(52) U.S. Cl. ........................... 714/26; 714/25; 714/38.1
(58) Field of Classification Search ................... 714/25, 714/32, 37, 38.1, 38.11, 38.14, 45
See application file for complete search history.

(56) References Cited

U.S. PATENT DOCUMENTS

| | | | |
|---|---|---|---|
| 5,838,975 A * | 11/1998 | Abramson et al. ............ 717/129 |
| 5,905,855 A | 5/1999 | Klaiber | |
| 6,122,738 A | 9/2000 | Millard | |
| 6,898,764 B2 | 5/2005 | Kemp | |
| 6,996,516 B1 | 2/2006 | Kimura | |
| 7,475,289 B2 * | 1/2009 | Rosaria et al. ............... 714/38.1 |
| 2004/0168107 A1 | 8/2004 | Sharp | |
| 2007/0016829 A1 * | 1/2007 | Subramanian et al. ......... 714/38 |
| 2010/0241904 A1 * | 9/2010 | Bailey et al. .................... 714/38 |

FOREIGN PATENT DOCUMENTS

WO WO03027850 A1 3/2003

* cited by examiner

*Primary Examiner* — Robert Beausoliel, Jr.
*Assistant Examiner* — Joseph D Manoskey
(74) *Attorney, Agent, or Firm* — Nelson and Nelson; Daniel P. Nelson; Alexis V. Nelson

(57) ABSTRACT

A method for identifying a problem in a software application is presented. The method may include enabling a user to define at least one usage scenario for a software application. The software application may be executed on a reference computer system according to the usage scenario and data reflecting a status of the reference computer system and the software application during execution may be acquired. The software application may be further executed in a subject computer system according to the usage scenario. Data reflecting a status of the subject computer system and the software application during execution may likewise be acquired. Finally, the data from the reference computer system may be compared with the data from the subject computer system to identify at least one difference therebetween.

20 Claims, 4 Drawing Sheets

SOFTWARE PROBLEM IDENTIFICATION TOOL

BACKGROUND

To detect and resolve a software problem, it is typically necessary to identify and isolate the software components involved in the scenario wherein the software problem has occurred. For simplicity, these scenarios may be referred to hereinafter as "usage scenarios."

SUMMARY

Embodiments of the invention have been developed to identify a problem in a software application executed on a computer system.

In some embodiments, a method for identifying a problem in a software application in accordance with the invention may include enabling a user to define at least one usage scenario for a software application. The software application may be executed on a reference computer system according to the usage scenario and data reflecting a status of the reference computer system and the software application during execution may be acquired.

The software application may be further executed in a subject computer system according to the usage scenario. Data reflecting a status of the subject computer system and the software application during execution may likewise be acquired. Finally, the data from the reference computer system may be compared with the data from the subject computer system to identify at least one difference therebetween.

A corresponding computer program product and system are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

Figure 1:
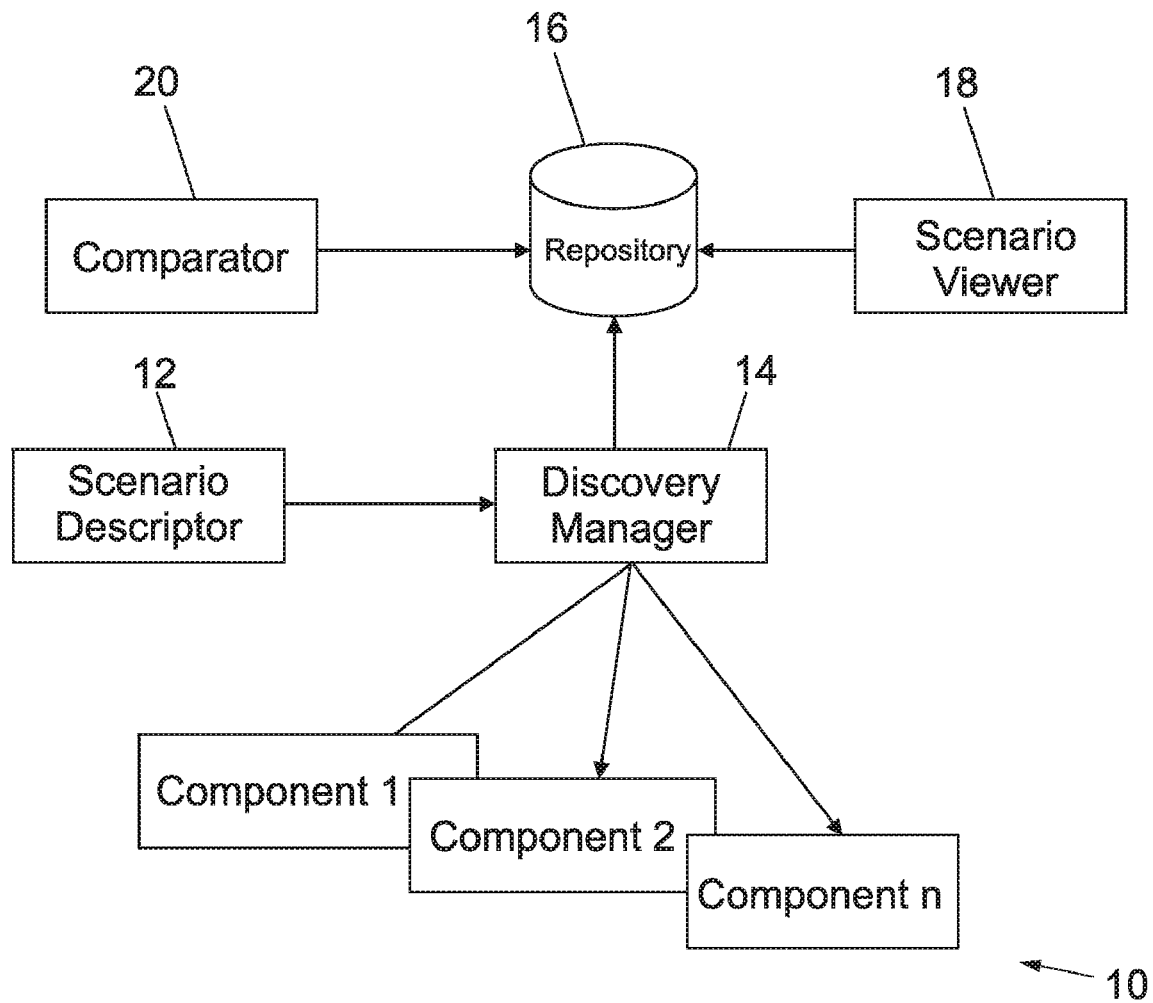
FIG. 1 is a block diagram of the architecture of a system in accordance with certain embodiments of the invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments of the present invention may provide a mechanism for accelerating the processes of isolating a software problem, detecting the nature of the problem, and resolving it. To this end, in some embodiments, the software components involved in the software system in which the problem occurred may be isolated. A predefined usage scenario may be automatically executed within the infrastructure of the faulty software application. Results of this process may then be compared to the results of executing the predefined usage scenario in a reference software system.

The predefined usage scenario may include a "reference usage scenario" or a "real-world usage scenario." As used herein, the term "reference usage scenario" refers to a typical usage scenario of the product, and may be provided by the software manufacturer. The term "real-world usage scenario" refers to a specific usage scenario that may be implemented by a user for specific purpose. The usage scenario the user employs may be largely dependent on how the user uses the software system under study.

Referring now to FIG. 1, a system 10 in accordance with embodiments of the invention may include a usage scenario descriptor 12 and a usage scenario snapshot (not shown) that may be transmitted between a discovery engine manager module 14 and a primary repository 16. The primary repository 16 may be further accessed by a usage scenario viewer module 18 and a usage scenario comparator module 20.

In one embodiment, the usage scenario descriptor 12 may include a file that describes a potential usage scenario and the software components involved in that usage scenario. The usage scenario may be a "reference usage scenario" or a "real-world usage scenario." As mentioned above, a reference usage scenario may be typical of the product and may be provided by the software manufacturer. A real-world usage scenario may be a specific usage scenario implemented by a user for specific purpose. The usage scenario descriptor 12 may be provided in XML format. However, the skilled person will understand that the usage scenario descriptor 12 is not necessarily represented in XML format, but may be structured in any suitable format.

Figure 2:
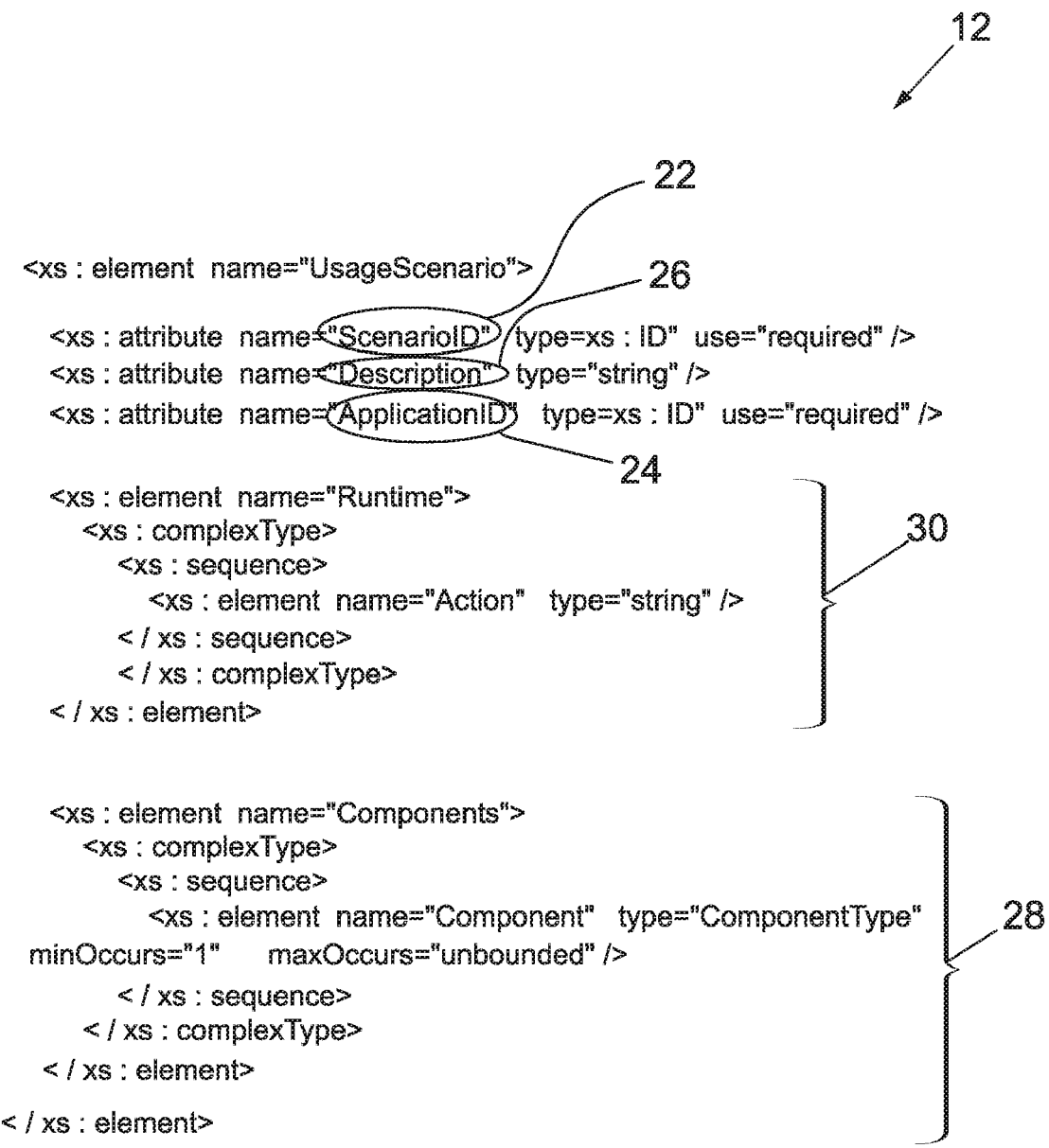
FIG. 2 depicts an XML file representing a usage scenario descriptor.

Referring now to FIG. 2, the usage scenario descriptor may 12 include a scenario ID 22 to identify a particular usage scenario. The usage scenario descriptor 12 may also include an application ID 24 to identify a software application. The software application and application components may be further detailed by a description tag 26 and a sequence of component elements 28. In one embodiment, the sequence of component elements 28 may include the name of the component and details regarding the computer on which it is installed. In one embodiment, for example, the sequence of component elements 28 may include hostname, protocol, and password needed to remotely execute the component.

The usage scenario descriptor 12 may further include a runtime section 30, which may describe a set of actions to be performed on the components of the application under study. The actions may include, for example, sending requests to components, receiving responses therefrom, and collating the responses to form a snapshot (e.g., logs, application status, system information, registry information) of the application under study.

As shown, the runtime section 30 is expressed in a script-like language. However, it will be appreciated that the runtime section 30 may also be expressed in other languages. Further, it will be appreciated that the above-mentioned formulation of the usage scenario descriptor 12 is provided by way of example only, and should not be construed as limiting in any way. In particular, the usage scenario descriptor 12 may use other tagging and descriptor mechanisms to identify and refer to the usage scenario in question and to the components of the software application in which the problem occurred.

The discovery engine manager module 14 may perform usage scenario discovery to execute the scenario described in the runtime section 30 of the usage scenario descriptor 12. The discovery engine manager module 14 may execute the scenario using the components listed in the component elements 28 section of the usage scenario descriptor 12. During this process, a usage scenario snapshot may be taken of the subject computer system. For simplicity, the term "snapshot" may be used hereinafter to refer to data pertaining to the status of a computer system.

The discovery engine manager module 14 may store both the usage scenario descriptors 12 and the usage scenario snapshots in the primary repository 16.

In one embodiment, the same usage scenario may also be executed on a reference computer system. The reference computer system may be a computer system where the product is installed and working as designed. In some embodiments, the reference computer may be a test computer system, (i.e., a computer system used by the customer to verify a product before installing it in a production computer). In other embodiments, the reference computer system may be the manufacturer's computer where the product is tested and used for creating snapshots of reference usage scenarios. Of course, the term "computer system," as used herein, may include a distributed computer system, where each of the software components of an application may reside on a different physical or virtual computer.

In certain embodiments, the usage scenario comparator module 20 may compare the usage scenario snapshot of the subject system with a snapshot taken of the reference computer system executing the same usage scenario. The usage scenario comparator module 20 may output the difference between the two snapshots to, inter alia, the usage scenario viewer module 18. The usage scenario viewer module 18 may graphically represent the relationships and flow of data between software components involved in the usage scenario. The usage scenario viewer module 18 may also depict differences between the usage scenario snapshot of the subject system and the reference system.

Figure 3:
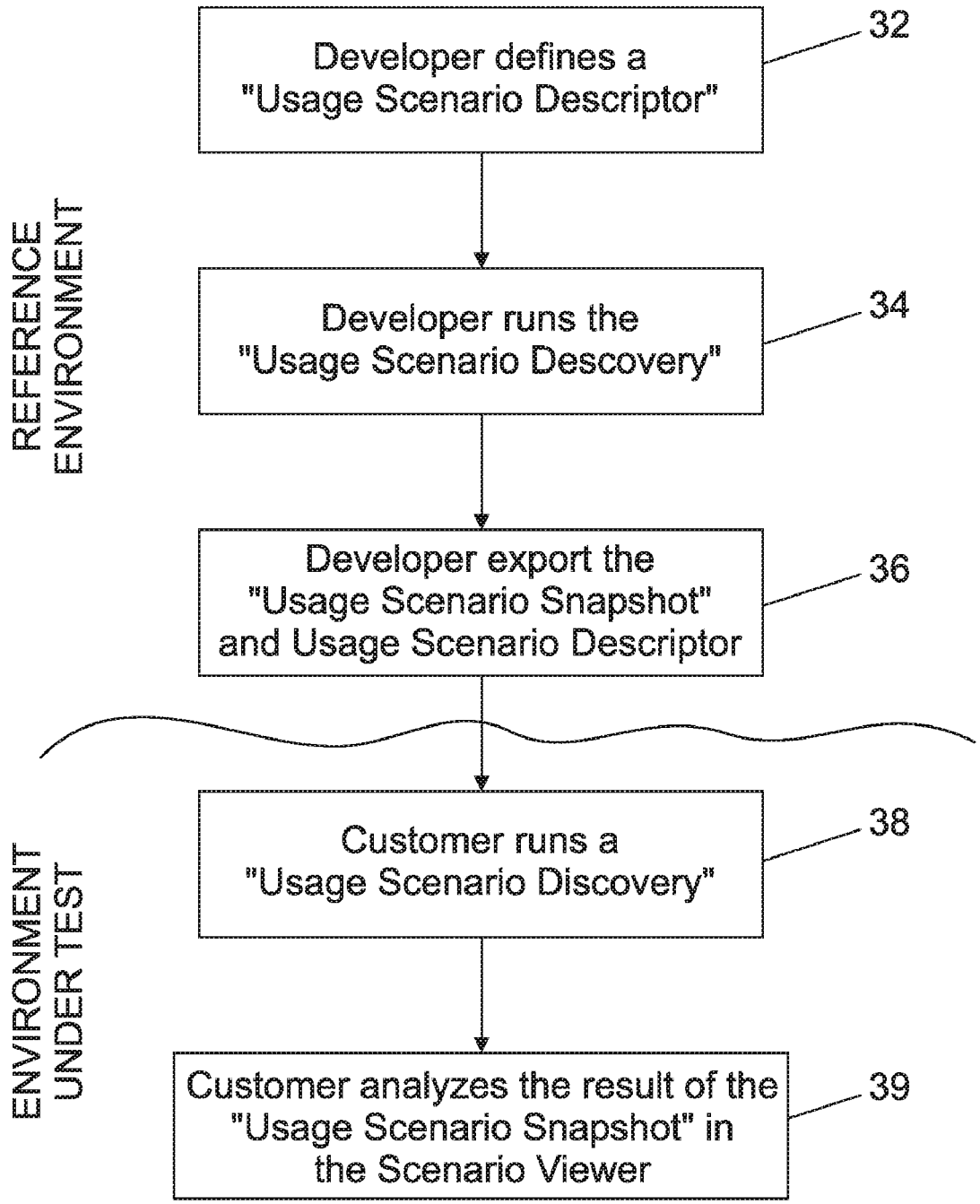
FIG. 3 is a flow chart of a method in accordance with an embodiment of the invention.

Referring now to FIG. 3, a method for identifying a problem in a software application in accordance with certain embodiments of the invention is illustrated. For illustrative purposes, FIG. 3 depicts certain actors performing certain method steps. Method steps in accordance with embodiments of the present invention, however, are not limited to such actors and may include any suitable actors known to those in the art.

In certain embodiments, a method for identifying a problem in a software application may include enabling 32 a user to define a usage scenario descriptor for a particular usage scenario. As previously discussed, the usage scenario may be a reference usage scenario or a real-world usage scenario. The user may be allowed 34 to execute a usage scenario discovery process in a reference environment and produce a snapshot thereof. The usage scenario descriptor and usage scenario snapshot of the reference environment may be exported 36 to the repository.

The method may then enable 38 a user of a subject computer system to perform usage scenario discovery of the computer system using the same usage scenario that was used with the reference system. As with the reference environment, the method may produce a snapshot of the subject system while executing the usage scenario discovery therein.

The method may then compare the usage scenario snapshot of the reference environment with that of the subject computer system, and enable the user to analyze 39 the results. In some embodiments, the user may analyze 39 the results of this comparison by way of a scenario viewer module. In any case, the user may thus detect and identify relevant problems of the subject computer system.

In some embodiments, such a method may be implemented at the end of an installation process to check if the product or patch has been successfully installed. In this case, a usage scenario descriptor may be defined for the installation process. In other embodiments, the method may be implemented for purposes of usage scenario test progression. In particular, a user may prepare a usage scenario descriptor for each regression scenario before applying a patch in a production environment. In still other embodiments, the usage scenario discovery process may be automatically run in a test environment to enable the comparator module to verify the result.

Figure 4:
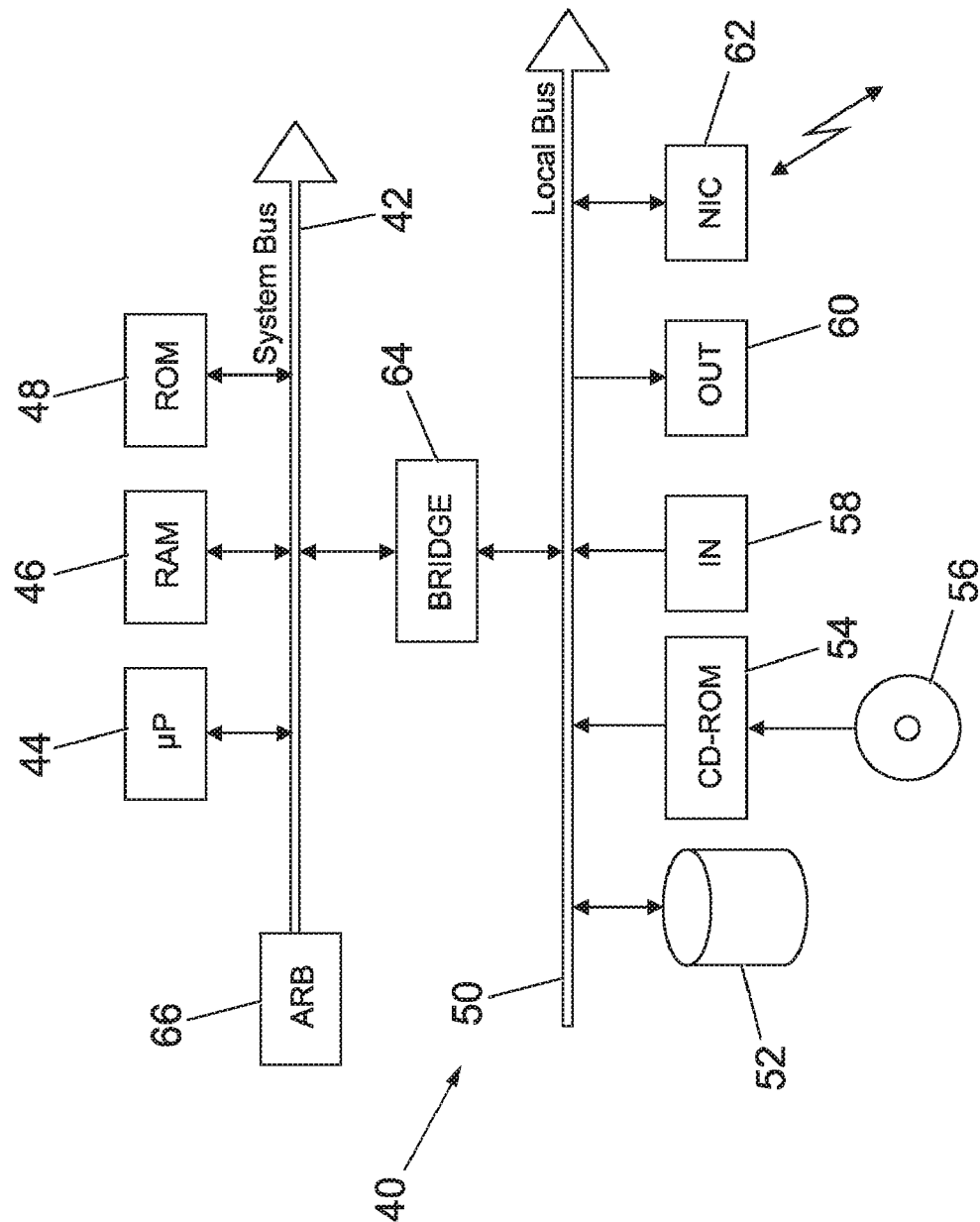
FIG. 4 is a block diagram of a computer system adapted to perform the method of FIG. 3.

Referring now to FIG. 4, a generic computer system 40 may be adapted to support certain embodiments of the invention. In one embodiment, the computer system 40 may include several units connected in parallel to a system bus 42. In detail, one or more microprocessors (μP) 44 may control operation of the computer 40. A RAM 46 may be directly used as a working memory by the microprocessors 44, and a ROM 48 may store basic code for a bootstrap of the computer 40. Peripheral units may be clustered around a local bus 50 by means of respective interfaces.

Particularly, a mass memory may include a hard-disk 52 and a drive 54 for reading CD-ROMs 56. The computer 40 may also include input devices 58 (for example, a keyboard and a mouse), and output devices 60 (for example, a monitor and a printer). A Network Interface Card ("NIC") 62 may be used to connect the computer 40 to the network. A bridge unit 64 may interface the system bus 42 with the local bus 50. Each microprocessor 44 and the bridge unit 64 may operate as master agents requesting access to the system bus 42 for transmitting information. An arbiter 66 may manage granting the access with mutual exclusion to the system bus 42.

Similar considerations may apply where the system has a different topology, or is based on other networks. Alternatively, the computer may have a different structure, including equivalent units, or may include other data processing entities such as personal digital assistants ("PDAs"), mobile phones, and the like.

The invention claimed is:

1. A method for identifying a problem in a software application executed on a computer system, the method comprising:

enabling a user to generate a usage scenario descriptor for a software application, wherein the usage scenario descriptor is a data structure describing a usage scenario for execution on a computer system;

parsing the usage scenario descriptor to determine the usage scenario;

executing, on a reference computer system, the usage scenario according to the usage scenario descriptor;

acquiring a snapshot of data reflecting a status of the reference computer system and the software application during execution;

executing, on a subject computer system, the usage scenario according to the usage scenario descriptor;

acquiring a snapshot of data reflecting a status of the subject computer system and the software application during execution; and comparing the snapshot reflecting the status of the reference computer system with the snapshot reflecting the status of the subject computer system to identify at least one difference therebetween.

2. The method of claim 1, further comprising enabling the user to analyze the at least one difference to identify a potential problem in the subject computer system.

3. The method of claim 1, wherein enabling a user to generate a usage scenario descriptor further comprises enabling a manufacturer to generate a usage scenario descriptor describing age scenario typical of the software application.

4. The method of claim 1, wherein enabling a user to generate a usage scenario descriptor comprises enabling the user to generate a usage scenario descriptor specific to the software application.

5. The method of claim 1, further comprising depicting at least one of a relationship and a flow of data between software components in the software application executed on the subject computer system.

6. The method of claim 1, further comprising executing the method at the end of a software installation process.

7. The method of claim 1, further comprising automatically executing the method upon detecting an error in the subject computer system.

8. The method of claim 1, further comprising executing the method in a distributed computing environment.

9. A computer program product for identifying a problem in a software application executed on a computer system, the computer program product comprising:

a non-transitory computer-readable storage medium having computer-usable program code stored thereon, the computer-usable program code comprising:

computer-usable program code for enabling a user to generate a usage scenario descriptor for a software application, wherein the usage scenario descriptor is a data structure describing a usage scenario for execution on a computer system;

computer-usable program code for parsing the usage scenario descriptor to determine the usage scenario;

computer-usable program code for executing, in a reference computer system, the usage scenario according to the usage scenario descriptor;

computer-usable program code for acquiring a snapshot of data reflecting a status of the reference computer system and the software application during execution;

computer-usable program code for executing, in a subject computer system, the usage scenario according to the usage scenario descriptor;

computer-usable program code for acquiring a snapshot of data reflecting a status of the subject computer system and the software application during execution; and computer-usable program code for comparing the snapshot from the reference computer system with the snapshot from the subject computer system to enable a user to identify at least one difference therebetween.

10. The computer program product of claim 9, wherein the computer-usable program code for enabling a user to generate a usage scenario descriptor comprises computer-usable program code for enabling a manufacturer to generate a usage scenario descriptor for a usage scenario typical of the software application.

11. The computer program product of claim 9, wherein the computer-usable program code for enabling a user to generate a usage scenario descriptor comprises computer-usable program code for enabling a user to generate a usage scenario descriptor specific to the software application.

12. The computer program product of claim 9, further comprising computer-usable program code for depicting at least one of a relationship and a flow of data between software components in the software application executed on the subject computer system.

13. The computer program product of claim 9, further comprising computer-usable program code for executing the foregoing computer-usable program code at the end of a software installation process.

14. The computer program product of claim 9, further comprising computer-usable program code for automatically executing the foregoing computer-usable program code upon detecting an error in the subject computer system.

15. The computer program product of claim 9, further comprising computer-usable program code for executing the foregoing computer-usable program code in a distributed computing environment.

16. A system for identifying a problem in a software application installed on a computer system, the system including:

at least one processor;

at least one memory device storing data structures for execution on the at least one processor, the data structures comprising:

a usage scenario descriptor to define at least one usage scenario for a software application;

a discovery engine manager module to execute, in each of a reference computer system and a subject computer system, the software application according to the usage scenario described in the usage scenario descriptor, and acquire a snapshot of data reflecting a status of each of the reference computer system and the subject computer system during execution; and a usage scenario comparator module to compare the snapshot reflecting the status of the reference computer system with the snapshot reflecting the status of the subject computer system to enable a user to identify at least one difference therebetween.

17. The system of claim 16, wherein the usage scenario descriptor is structured as an XML file.

18. The system of claim 16, wherein the data structures further comprise a usage scenario viewer module to enable the user to analyze the at least one difference to identify a potential problem in the subject computer system.

19. The system of claim 18, wherein the usage scenario viewer module further graphically represents at least one of a relationship and a flow of data between software components of the software application executed on the subject computer system.

20. The system of claim 16, wherein the usage scenario descriptor is provided by a manufacturer to define at least one usage scenario typical of the software application.

* * * * *